United States Patent
Muller et al.

(10) Patent No.: US 9,344,884 B2
(45) Date of Patent: May 17, 2016

(54) MODULE FOR AUTHENTICITY VERIFICATION OF AUTHENTICATION MESSAGES

(71) Applicants: Koninklijke KPN N.V., The Hague (NL); Nederlandse Organisatie voor Toegepast-Natuurwetenschappelijk Onderzoek TNO, Delft (NL)

(72) Inventors: Frank Muller, Delft (NL); Frank Fransen, Groningen (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 150 days.

(21) Appl. No.: 13/722,828

(22) Filed: Dec. 20, 2012

(65) Prior Publication Data

US 2013/0157621 A1 Jun. 20, 2013

Related U.S. Application Data

(62) Division of application No. 13/158,821, filed on Jun. 13, 2011, now Pat. No. 8,526,917.

(30) Foreign Application Priority Data

Jun. 14, 2010 (EP) .................................... 10165847

(51) Int. Cl.
*H04M 1/66* (2006.01)
*H04M 1/68* (2006.01)
(Continued)

(52) U.S. Cl.
CPC .............. *H04W 12/06* (2013.01); *H04L 9/083* (2013.01); *H04L 9/3271* (2013.01);
(Continued)

(58) Field of Classification Search
CPC ...... H04W 12/06; H04W 12/12; H04W 64/00; H04W 4/02; H04W 8/18; H04W 8/205; H04L 63/08; H04L 29/08657
USPC .................... 455/411, 456.3, 456.1; 713/171; 370/395.5
See application file for complete search history.

(56) References Cited

U.S. PATENT DOCUMENTS 7,600,116 B2 10/2009 Bajko et al.
8,086,247 B2 * 12/2011 Kraufvelin ............ H04W 8/205
370/395.5

(Continued)

FOREIGN PATENT DOCUMENTS

KR 10-2010-0054191 5/2010

OTHER PUBLICATIONS

European Search Report, European Patent Application 10165847.4 dated Feb. 25, 2011.

(Continued)

*Primary Examiner* — William D Cumming
(74) *Attorney, Agent, or Firm* — McDonnell Boehnen Hulbert & Berghoff LLP

(57) ABSTRACT

At least a method for verifying the authenticity of one or more authentication messages in an authentication procedure between a network and a mobile device is described wherein the method comprises: sending an authentication request through a first radio access node to a said mobile device, said radio access node being associated with first location information; said mobile device generating second location information associated with the location of said mobile device; and, verifying the authenticity of the origin of said authentication request by checking if said second location information comprises said first location information.

7 Claims, 8 Drawing Sheets

(51) Int. Cl.
  *H04M 3/16* (2006.01)
  *H04W 24/00* (2009.01)
  *H04W 12/06* (2009.01)
  *H04L 9/08* (2006.01)
  *H04L 9/32* (2006.01)
  *H04L 29/06* (2006.01)
  *H04W 4/02* (2009.01)
  *H04W 64/00* (2009.01)

(52) U.S. Cl.
  CPC ......... *H04L 63/0869* (2013.01); *H04L 63/107* (2013.01); *H04L 63/0853* (2013.01); *H04L 2209/80* (2013.01); *H04W 4/02* (2013.01); *H04W 64/00* (2013.01)

(56) References Cited

U.S. PATENT DOCUMENTS

| | | | |
|---|---|---|---|
| 8,397,062 | B2 | 3/2013 | Roy-Chowdhury et al. |
| 8,526,917 | B2 * | 9/2013 | Muller .................. H04L 9/083 455/411 |
| 2005/0097363 | A1 | 5/2005 | Bajko et al. |
| 2008/0182592 | A1 | 7/2008 | Cha et al. |
| 2009/0143078 | A1 * | 6/2009 | Tu ............................. H04W 8/18 455/456.3 |
| 2009/0170532 | A1 * | 7/2009 | Lee .................. H04M 1/72566 455/456.3 |
| 2010/0268943 | A1 | 10/2010 | Roy-Chowdhury et al. |
| 2011/0179277 | A1 * | 7/2011 | Haddad .................. H04L 45/60 713/171 |
| 2011/0312301 | A1 * | 12/2011 | Muller .................. H04L 9/083 455/411 |
| 2012/0210415 | A1 | 8/2012 | Somani et al. |
| 2012/0317261 | A1 | 12/2012 | Ahmavaara |
| 2013/0157621 | A1 * | 6/2013 | Muller .................. H04L 9/083 455/411 |

OTHER PUBLICATIONS

"3rd Generation Partnership Project: Technical Specification Group SA WG3; A Guide to 3rd Generation Security (3G TR 33.900 version 1.2.0)", 3G TR 33.900 V1.2.0, Jan. 2000, pp. 1-26.

3GPP TS 33.102 V9.2.0 (Mar. 2010) 3rd Generation Partnership Project; Technical Specification Group Services and System Aspects; 3G Security; Security architecture (Release 9) pp. 1-72.

3GPP TS 33.401 V9.4.0 (Jun. 2010) 3rd Generation Partnership Project; Technical Specification Group Services and System Aspects; 3GPP System Architecture Evolution (SAE); Security architecture (Release 9) pp. 1-104.

3GPP TS 33.203 V9.4.0 (Jun. 2010) 3rd Generation Partnership Project; Technical Specification Group Services and System Aspects; 3G security; Access security for IP-based services (Release 9) pp. 1-114.

3GPP TS 33.220 V9.3.0 (Jun. 2010) 3rd Generation Partnership Project; Technical Specification Group Services and System Aspects; Generic Authentication Architecture (GAA); Generic bootstrapping architecture (Release 9) pp. 1-75.

3GPP TS 33.222 V9.1.0 (Jun. 2010) 3rd Generation Partnership Project; Technical Specification Group Services and System Aspects; Generic Authentication Architecture (GAA); Access to network application functions using Hypertext Transfer Protocol over Transport Layer Security (HTTPS) (Release 9) pp. 1-22.

3GPP TS 33.223 V9.1.0 (Mar. 2010) 3rd Generation Partnership Project; Technical Specification Group Services and System Aspects; Generic Authentication Architecture (GAA); Generic Bootstrapping Architecture (GBA) Push function (Release 9) pp. 1-23.

ETSI EN 300 175-1 V1.9.1 (Sep. 2005) European Standard (Telecommunications series) Digital Enhanced Cordless Telecommunications (DECT); Common Interface (CI); Part 1:Overview, pp. 1-28.

* cited by examiner

MODULE FOR AUTHENTICITY VERIFICATION OF AUTHENTICATION MESSAGES

CROSS REFERENCE TO RELATED APPLICATIONS

The present patent application is a divisional of U.S. patent application Ser. No. 13/158,821, entitled "Authenticity Verification of Authentication Messages," filed Jun. 13, 2011, which claims priority under 35 U.S.C. §119(b) to EP 10165847.4, which was filed Jun. 14, 2010. The full disclosures of U.S. patent application Ser. No. 13/158,821 and EP 10165847.4 are incorporated herein by reference.

FIELD OF THE INVENTION

The invention relates to verification of the authenticity of authentication messages and, in particular, though not exclusively, to a method for verifying the authenticity of one or more authentication messages in an authentication procedure between a network and a mobile device, a hardware module and a computer program product using such method and a smart card for use with such hardware module.

BACKGROUND OF THE INVENTION

The new generation mobile devices, such as smart phones, provide more and more enhanced computational functionalities via open network connections. Such mobile devices are e.g. capable of receiving e-mail, share software with one another through short-range connections, downloading and executing software from the Internet, making automated calls and act under remote control. Hence, similar to a personal computer, mobile devices and in particular the software components involved in the setting up of a connection between the mobile device to the network, are vulnerable to attacks of malicious software (malware).

Typically malware attempts to make misuse of mobile device or to simply disrupt legitimate use of a mobile device and to use of security flaws in the authentication procedure, usually referred to as an authentication and key agreement (AKA), which provides a subscriber access to a network. Nowadays are AKAs designed not only to authenticate the mobile device to the network, but also to authenticate the network to the mobile device. For example, the UMTS AKA uses a mutual authentication procedure wherein the mobile device has to authenticate itself to the Visitor Location Register (VLR) and the VLR has to authenticate itself to the mobile device. Well known AKAs and their associated security threats are described in 3GPP TR 33.900.

From this document it follows for example that the UMTS AKA is vulnerable to certain types of man-in-the-middle attacks, wherein a mobile device of an attacker may use authentication information such as the RES from the (U)SIM of the victim in order to obtain access to the network. Such a man-in-the-middle attack may result in the attacker accessing the network as if the connection was set up by the victim. As the network in such a situation cannot distinguish between a legitimate connection and a man-in-the-middle using malware on the victim's mobile device, the attacker is allowed to use services on the expenses of the victim thereby causing substantial damage.

Hence, there is a need in the art for improved methods and systems for authentication to a network.

KR 20100054191 describes a method to solve the possible synchronisation problem of authentication vectors (AV) between the Home Network and other service networks using a shared key and Time Stamps. The method involves including location information, the so-called Location Area Identity (LAI), in the computation of the Message Authentication Code (MAC) on various authentication messages and verifying the MACs on these messages. If a LAI is quite large, it it possible, however, that the attacker and the victim are in the same LAI, in which case the method of KR 20100054191 does not protect against the described attack. More importantly, if the mobile device is moving, after sending the registration request it may have ended up in a different LAI, in which case the verification method of KR 20100054191 fails, because the mobile device and the network carry out the computation of the MACs with different LAI values.

US 2008/182592 describes a method for obtaining location information from a mobile device in a secure way. The location information is generated at the mobile device and then either signed by the mobile device with a private key or incorporated in the messages of the normal authentication protocol. This patent application, however, does not contain a cross-check of the location information present at the network side and the location information present at the mobile device.

SUMMARY OF THE INVENTION

It is an object of the invention to reduce or eliminate at least one of the drawbacks known in the prior art. In a first aspect the invention may relate to a method for verifying the authenticity of one or more authentication messages in an authentication procedure between a network and a mobile device comprising: sending an authentication request through a first radio access node to a said mobile device, said radio access node being associated with first location information; said mobile device generating second location information associated with the location of said mobile device; and, verifying the authenticity of the origin of said authentication request by checking if said second location information comprises said first location information.

In particular, the invention may relate to a method for verifying the authenticity of one or more authentication messages in an authentication procedure between a network and a mobile device comprising: sending an authentication request through a first radio access node to a said mobile device, said radio access node being associated with first location information; said mobile device generating second location information consisting of a list of location information associated with the location of said mobile device; and, transmitting first location information from the first radio access node to the mobile device or the second location information from the mobile device to the first radio access node; and, verifying the authenticity of the origin of said authentication request by checking if said first location information is comprised in the list constituted by the second location information.

In one embodiment the list of location information may comprise a list of access nodes visible to the mobile equipment and/or the access node to which the mobile equipment is connected to.

Hence, the authentication procedure uses location information, in particular a list of access nodes visible to the mobile equipment and/or the access node to which the mobile equipment is connected to. Access nodes may be identified using one or more identifiers e.g. the Cell IDs of the Node-Bs or the base stations. On the basis of the location information the authenticity of the messages sent over the communication channel between the network and the ME may be checked. In particular, the invention allows checking the authenticity of the origin of an authentication request. The invention is based on the insight that in most cases an attacker is not in the vicinity of the rightful subscriber (i.e. its victim). Hence, the attacker communicates with the ME of the victim through another base station than the one used by the malware-infected ME, so it is unlikely that both ME are connected via the same access node to the network.

In one embodiment said second location information may comprise location information associated with one or more radio access nodes which are within the radio reception range of said mobile device.

In another embodiment the method may comprise: sending an authentication request through a first radio access node associated with first location information to a mobile device; generating response information on the basis of authentication information in said authentication request; sending an authentication response comprising said response information and second location information to the network.

In a further embodiment said second location information may be generated in a secure hardware module.

In yet another embodiment, the method may comprise: generating a digital signature associated with at least part of said second location information; preferably said digital signature being generated in a secure hardware module in or associated with the mobile device; sending said digital signature in said authentication response to said network; checking the integrity of said second location information on the basis of said digital signature.

In one embodiment said digital signature and said integrity check may be based on a message authentication protocol or a protocol based on a digital certificate associated with said mobile device, preferably a digital certificate associated with a secure module in said mobile device, said digital certificate comprising at least one public-private key pair.

In one variant the method may comprise: sending an authentication request comprising first location information through a first radio access node to a mobile device; in response to said authentication request, sending an authentication response if at least part of said second location information matches said first location information. In this embodiment the mobile device may check the authenticity thereby providing the advantage that the HLR/AuC and the (U)SIM (or UICC) do not require any modifications.

In another variant, the method may comprise: generating a digital signature associated with at least part of said second location information; sending said digital signature in said authentication request to said mobile device; checking the integrity of said second location information on the basis of said digital signature; preferably said digital signature being checked in a secure hardware module in or associated with the mobile device.

In yet another variant, the method may comprise: sending an authentication request through a first radio access node associated with first location information to a mobile device; on the basis of at least part of the authentication information in said authentication request and said second location information, generating response information. sending an authentication response comprising said response information to the network.

In a further variant, said response information may be generated on the basis of a cryptographic function, preferably a cryptographic one-way function, using at least part of said authentication information and said second location information as input parameters. Using such function provides the advantage that the AKA messages to the RAN do not have to be modified. Moreover, also the HLR/AuC and the (U)SIM do not have to be modified.

In another variant, the method may comprise: if at least part of said second location information matches said first location information, generating an expected authentication response; and, if said expected authentication response matches said authentication response providing said mobile device access to said network.

In a further aspect, the invention may relate to a hardware module for use in a mobile device, said hardware module being configured for verifying the authenticity of one or more authentication messages in an authentication procedure between a network and said mobile device, wherein said hardware module may comprise: a radio interface for providing a radio connection between said mobile device and a radio access node associated with said network; a location detector for generating second location information associated with one or more radio access nodes which are within the radio reception range of said mobile device; an interface controller for connecting a smart card to said hardware module, said smart card being configured for generating authentication information in response to an authentication request.

In one embodiment said hardware module may further comprise a microprocessor configured for checking if said second location information comprises said first location information and/or configured for generating a digital signature associated with said second location information.

In another aspect, the invention may relate to a smart card for use with a hardware module as described above, wherein said smart card may be configured to generate an authentication response on the basis of said second location information and authentication information in an authentication request received by said radio interface of said hardware module.

In yet another aspect, the invention may relate to a smart card for use with a hardware module as described above, wherein said smart card may be configured to generate an authentication response on the basis authentication information in an authentication request received by said radio interface of said hardware module and to generate a digital signature of said second location information and to generate a digital signature associated with at least part of said second location information.

In one aspect, the invention may relate to a network node configured to verify the authenticity of one or more authentication messages in an authentication procedure between a network and a mobile device, wherein the network node may comprise: a transmitter for sending an authentication request comprising authentication information through a first radio access node to a said mobile device, said radio access node being associated with first location information; a receiver for receiving an authentication response comprising said second location information or an authentication response generated on the basis of said authentication information and second location information; and, a processor for checking if said second location information comprises said first location information or if said authentication response generated on the basis of said second location information matches an expected authentication response generated on the basis of said authentication information and said first location information.

The invention may also relate to a computer program product comprising software code portions configured for, when run in the memory of a terminal, preferable a mobile device, executing any of the method steps as described above.

The invention will be further illustrated with reference to the attached drawings, which schematically will show embodiments according to the invention. It will be understood that the invention is not in any way restricted to these specific embodiments.

DETAILED DESCRIPTION

Figure 1:
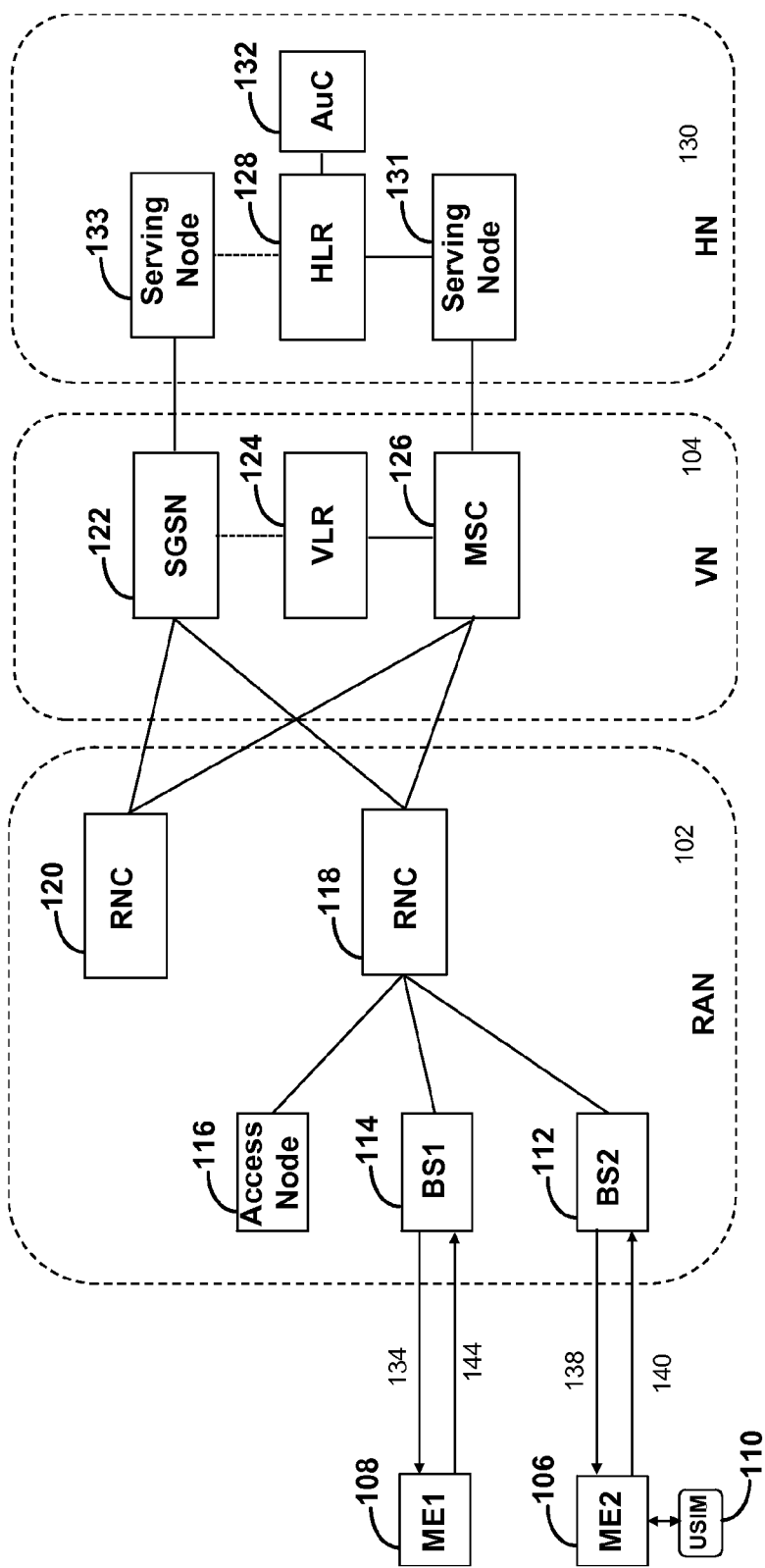
FIG. 1 depicts a man-in-the-middle attack targeted at a mobile device connected to a known communications system.

FIG. 1 depicts a schematic of at least part of a known communications system 100 comprising user equipment (UE) 106, 108, e.g. a personal computer or a mobile device such as a smart phone, a personal digital assistant (PDA), a laptop or any other mobile communications device capable of receiving wireless services, configured to be connected to a mobile communications network 102, 104, e.g. a 2G, 3G or 4G type mobile network. Examples of such networks may include GSM, UMTS and LTE-type networks. Such a mobile network may comprise a radio access network 102 comprising one or more access nodes 112-116, e.g. radio base stations (Node-B), serving as access points for MEs located within a certain area around the base station. For example, in FIG. 1 ME 106 is within the area ("cell") covered by access node 112 and ME 108 is within the area covered by access node 114. The access nodes may be connected via one or more control nodes, e.g. a Radio Network Controller (RNC) 118, 120, to a mobile core of a visiting network 104 (VN). Such mobile core may comprise one or more serving nodes, e.g. a Serving GPRS Support Node (SGSN) 122 associated with packet-switched (PS) services and a Mobile Switching Center (MSC) 126 for circuit-switched (CS) services and a register, e.g. a visiting location register (VLR) 124, for storing data associated with MEs connected to the visiting network. The VLR may be used for the execution of security functions.

The mobile core of the VN may be further linked a register, e.g. the home location register (HLR) 128, located in the mobile core of the home network (HN) 130 comprising one or more serving nodes 133, 131. The HLR may be used for storing user related data, e.g. subscription related data, and may co-operate with the serving node and the VLR 124 to keep track of the location of the ME. Further, the HLR may be associated with an authentication centre (AuC) 132, which may be connected to or co-located with the HLR. The AuC comprises (amongst others) algorithms for calculation of authentication parameters used in the authentication procedure. To that end, the AuC stores for each subscriber a secret authentication key K which is also stored in an associated identity module, e.g. a (U)SIM card or the like, located in the ME.

A network as depicted in FIG. 1 may use a security protocol, also referred to as an Authentication and Key Agreement (AKA), in order to provide secure access to the network. For example, ETSI TS 33.102 describes an AKA for use in 3G communication networks for providing authentication between an ME and a network. Other AKA's may include the 4G (EPG) AKA as described in TS 33.401

Such AKA's use a network authentication token AUTN for the purpose allowing the ME to authenticate the network thereby preventing so-called a "false base station" attack, wherein malware simulates a base station which in reality does not belong to the network. While the use of an AUTN may successfully counter several types of such false base station attacks, it cannot prevent a so-called "man-in-the-middle" attack wherein an attacker may achieve network access as if the connection was set up by an authorized ME.

The principle of such attack is schematically shown in FIG. 1, wherein an attacker ME1 108 receives a network message 134 comprising a random value RAND and an AUTN to which it must respond to in a response message with response parameter RES in order to obtain network access. Using a data link that the malware has set up between the attacker ME1 108 and an infected device ME2 106, the attacker relays the network message to the USIM 110 of ME2 106 that calculates the corresponding RES and the ciphering and integrity protection keys. This response parameter and the keys are transmitted back to the attacker ME1, which sends the RES over 144 to the network in order to authenticate itself to the network. After successful authentication, the network considers the attacker as the rightful subscriber allowing the attacker to set up calls or to obtain other services that subsequently will be charged to the (impersonated) rightful subscriber.

The keys for ciphering and integrity protection as obtained through the AKA have a limited lifetime in order to prevent attempts to break the cipher or integrity protection by brute force long duration monitoring attacks. Hence, upon expiry, a re-authentication procedure, between the terminal and the network is executed. This re-authentication process is regularly repeated. In that case, the attacker may re-authenticate itself to the network using the same process as described above. Hence, as illustrated by the process depicted in FIG. 1, improved methods and systems are desired in order to prevent misuse of authentication information exchanged between MEs and the network.

Figure 2:
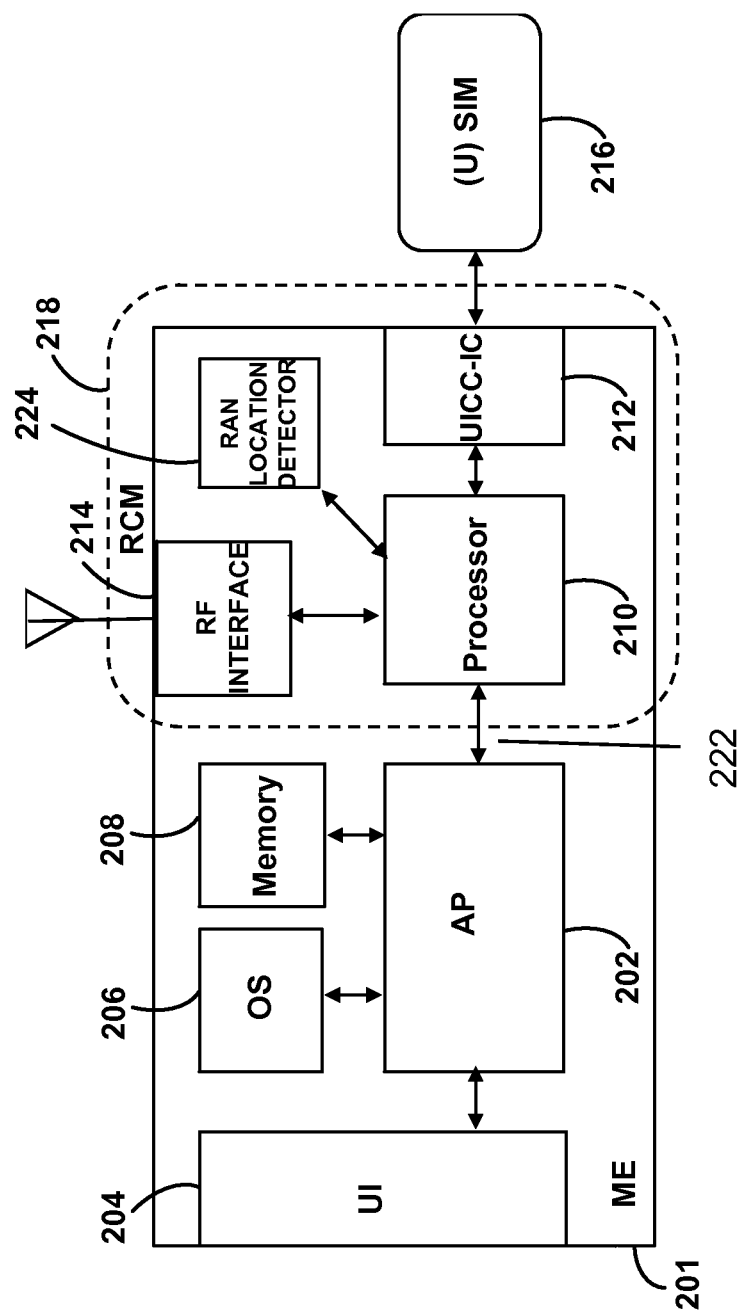
FIG. 2 depicts a schematic a mobile device according to one embodiment of the invention.

FIG. 2 depicts a UE 200, i.e. a mobile equipment (ME) 201 connected to an (U)SIM 216, according to one embodiment of the invention. The UE may comprise an application processor (AP) 202 for executing and managing an Operating System (OS) 206, a User Interface 204 and software applications, which may be stored in a memory 208. The UE may further comprise a radio card module 218 comprising a further processor 210, hereafter referred to as the base band processor (BP) for controlling the radio communications between the UE and an access node of a wireless network using a RF communications interface 214. Data exchange between the AP and the radio card module, in particular the BP in the radio card module, may be provided by a communication bus 222.

The radio card module may further comprise a Universal Integrated Circuit Card (UICC) interface controller (UICC-IC) 212 for providing a secure interface between an UICC 216, i.e. a smart card, comprising the (U)SIM and/or ISIM applications and one or more secure keys executing the secure operations associated with the AKA. The radio card module may also comprise a Radio Access Network (RAN) location detector 224 for detecting location information, i.e. information regarding the base stations currently visible to the UE, and for determining the base station to which the UE is currently connected to. Such location information may comprise one or more cell identifiers of the access nodes or GPS generated geo-coordinates of the access nodes or, alternatively, information based on such identifiers and/or geo-coordinates, e.g. a hash value of such identifiers or coordinates). The hardware implementation of the UE is such that the UICC-IC and the RAN location detector are embedded in separate tamper-free hardware components that cannot be controlled by the application software executed on the UE.

In one embodiment, the RAN location detector and the UICC interface controller may be embedded in the hardware of the base band processor. In other embodiment, the RAN location detector may be embedded in the hardware of the base band processor and the RAN location detector may be connected via a separate bus to the UICC interface controller. Such hardware architecture prevents software applications executed by the AP to manipulate the radio communication of the UE.

Hence, the UICC may be contacted by a radio access network (e.g. GSM, GPRS, UMTS, LTE etc.) in order to authenticate network access. To that end, the RF interface of the radio card module may be configured in accordance with various wireless technologies using licensed frequency bands (e.g. TDMA for GSM services or W-CDMA for UMTS services).

Additionally, in a further embodiments, the AKA applications in the UICC may also be used for authentication services associated with IMS (IMS-AKA, see e.g. 3GPP TS 33.203), WLAN interworking (EAP-AKA), a wireless technology standard for exchanging data over short distances, such as BLUETOOTH® (BLUETOOTH® SIM profile) or Generic Bootstrapping Architectures (GBA-AKA, see e.g. 3GPP TS 33.220, 33.222, 33.223). In that case, the radio card module may be enhanced with wireless interfaces supporting, e.g. the IEEE 802.11 interface for WLAN services, the IEEE 802.15.1 interface for BLUETOOTH® services, an DECT interface as described in ETS 300 175, etc.

Using a UE as depicted in FIG. 2, the authenticity of the messages between the ME and the core network may check during the execution of an AKA using location information present in the network and/or in the ME. Advantageous uses of the invention are discussed hereunder in more detail with reference to FIG. 3-11.

Figure 3:
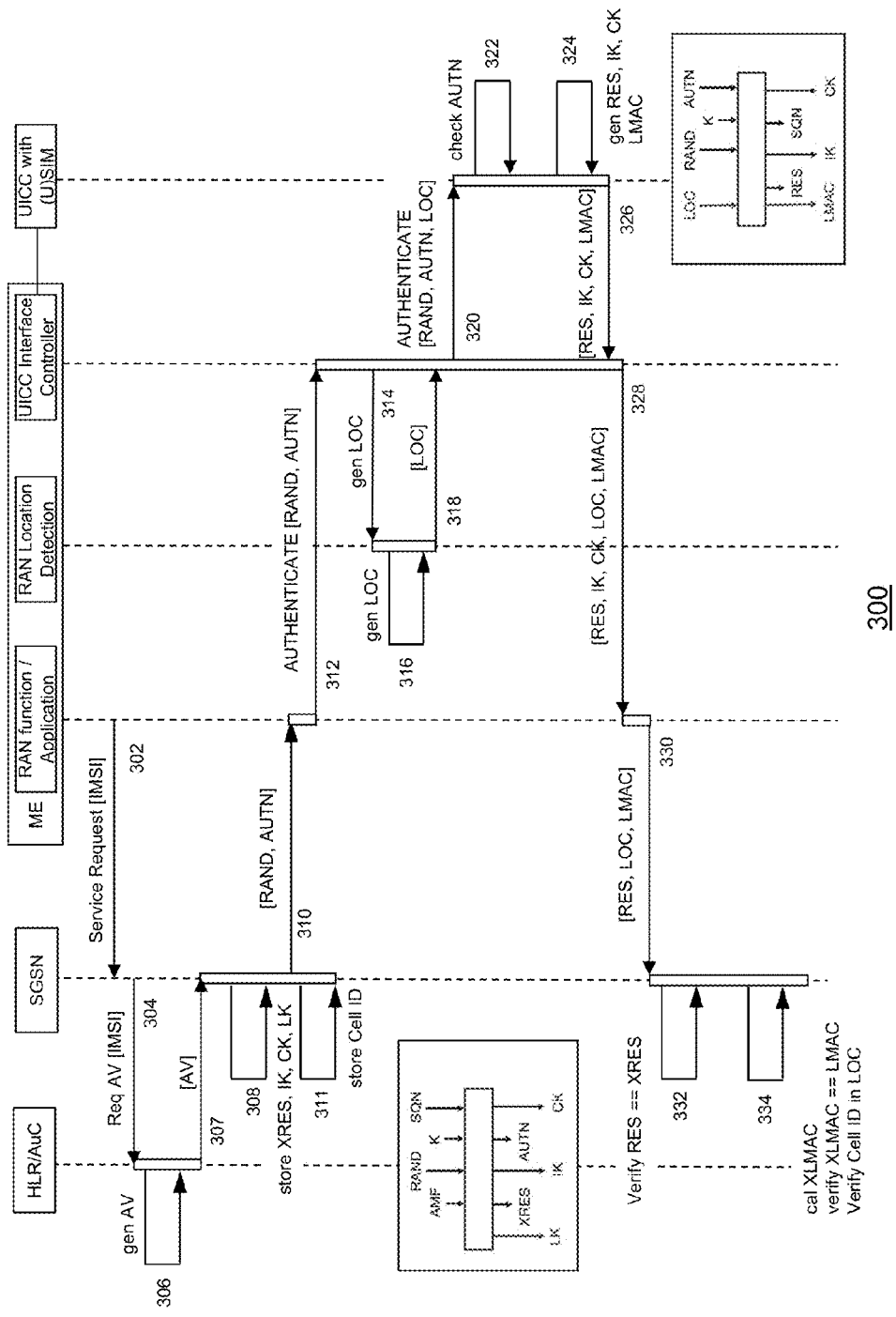
FIG. 3 depicts a message flow according to one embodiment of the invention.

FIG. 3 depicts a message flow 300 according to one embodiment of the invention. In this particular example, the authentication process is based an UMTS AKA which is enhanced with functionality for processing location information generated by a RAN location detector in the UE as described with reference to FIG. 2. The process starts with a ME application sending a service request message comprising a ME identifier, e.g. an IMSI, to a network access service in the network (step 302). In response to the request, the SGSN requests the HLR/AuC to generate an authentication vector (AV) (step 304). The AuC subsequently generates the known 3G AKA parameters RAND, AUTN, CK, IK and an expected authentication response XRES (step 306). Moreover, on basis of the RAND, it will generate a further AKA parameter hereafter referred to as the a location key: LK=$f_K6$(RAND), wherein f6 and K are an additional 6-th AKA function and a long-term secret key respectively, which are shared between the (U)SIM and the AuC. These parameters RAND, AUTN, CK, IK, XRES and LK are subsequently sent in an authentication vector to the SGSN (step 307).

The SGSN stores the AKA parameters in a memory (step 308) and subsequently sends the authentication information, i.e. RAND and the AUTN, in an authentication request to the ME (step 310). The Cell ID is associated with the base station over which this information was sent to the ME is also stored with the AKA parameters in the memory (step 311).

In the ME, the authentication request is forwarded to the UICC-IC (step 312), which requests the RAN Location Detector for location information associated with the UE (step 314).

In one embodiment, the location information may relate to a list of visible Cell IDs and/or for the Cell ID to which the ME is currently connected. In some other embodiments, the location information may relate to the geo-location of the UE as determined by a GPS receiver in the UE. In that case, it is required that the network has knowledge on the geo-location of the access nodes over which the UEs exchanges authentication information with the network.

The RAN Location Detector generates a LOC parameter comprising the requested location information, e.g. Cell ID or Cell IDs, (step 316), returns this parameter to the UICC-IC (step 318), which inserts the location information LOC in the authentication request and forwards the authentication request to the (U)SIM (step 320). The (U)SIM application checks the AUTN and generates the known 3G AKA parameters RES, IK, CK (step 322). Further, the (U)SIM generates LK, which is subsequently used to protect the integrity of the location information LOC when transmitted over the network.

As is not possible to use IK for integrity protection since this key is passed along with the RES and CK to the Radio Card (or possibly the Malware), in this embodiment the location key LK is used to generate a Message Authentication Code (LMAC) (step 324) using a further additional 7-th AKA function shared between the AuC and the (U)SIM: LMAC=$f7_{LK}$(LOC). The $f7_{LK}$ function may be a keyed hash function or a function based on a block cipher. The LMAC may be used to check the integrity of the location information LOC after transmission to the network. These generated parameters are subsequently sent to the UICC-IC (step 326).

The UICC-IC may return the RES, IK, CK, LOC and LMAC to the radio card (step 328). The ME forwards RES, LOC and LMAC to a serving node of the network, e.g. the SGNS (step 330). The SGNS may generate an expected response XRES on the basis of the stored K and RAND and an XLMAC on the basis of the on the stored LK and the received LOC. Thereafter, the SGNS may compare the authentication response RES with an expected authentication response XRES and the MAC code LMAC with an expected MAC code XLMAC (step 332). If it is determined that both conditions are met, the SGSN may further check if the LOC comprises a Cell ID, which matches the stored Cell ID 334. If a match is found the authentication procedure is correctly executed.

The authentication procedure as described with reference to FIG. 3 uses location information, such as one or more identifiers associated with the access nodes (e.g. the Cell IDs of the Node Bs or the base stations), which are visible to the ME and/or an identifier associated with the access node to which the ME is connected. On the basis of the location information the network may check the authenticity of the messages send between the ME and the network. The invention is based on the insight that in most cases an attacker is not in the vicinity of the rightful subscriber (i.e. its victim). Hence, the attacker communicates with the ME of the victim through another base station than the one used by the malware-infected ME, so it is unlikely that both ME are connected via the same access node to the network.

The network may decide on the consistency of the response RES by having the subscriber's device to identify all radio access nodes within reception range of the ME. These access nodes (e.g. base stations or Node Bs) may be identified by identifiers, e.g. a cell ID, which may be sent in a list to the network. The location information LOC is sent to the network using a MAC protocol so that both the authenticity and the integrity of the LOC parameter may be checked.

The network is capable of making this decision because it has knowledge through which base station the RAND was transmitted. For example, in a situation as depicted in FIG. 1, the network knows that the RAND is sent through a first base station BS1 114. Along with the response RES generated by the device 106 of the rightful subscriber, the device also sends a list of base stations visible to the device (in the example of FIG. 1 the second base station BS2 112). When the network receives this response message (relayed by the attacker's device 108), it determines that BS1 does not appear in the list of base stations, signals this inconsistency and refuses access to the network. Hence, using the location information in the AKA messages exchanged between the network and the ME a man-in-the-middle attack as described with reference to FIG. 1 may be effectively prevented.

The location information generated by the RAN location detector, e.g. the list of base stations which are visible to the ME, may be maintained by the radio card, or at least a dedicated hardware device in the radio card, that may not be tampered with by malware. Moreover, the (messages containing the) list of base stations may be associated with an authentication code, i.e. a secure digital signature such as an LMAC generated by the (U)SIM or the radio card, that cannot or is at least very difficult to falsify or reused by the malware and/or attacker.

Figure 4:
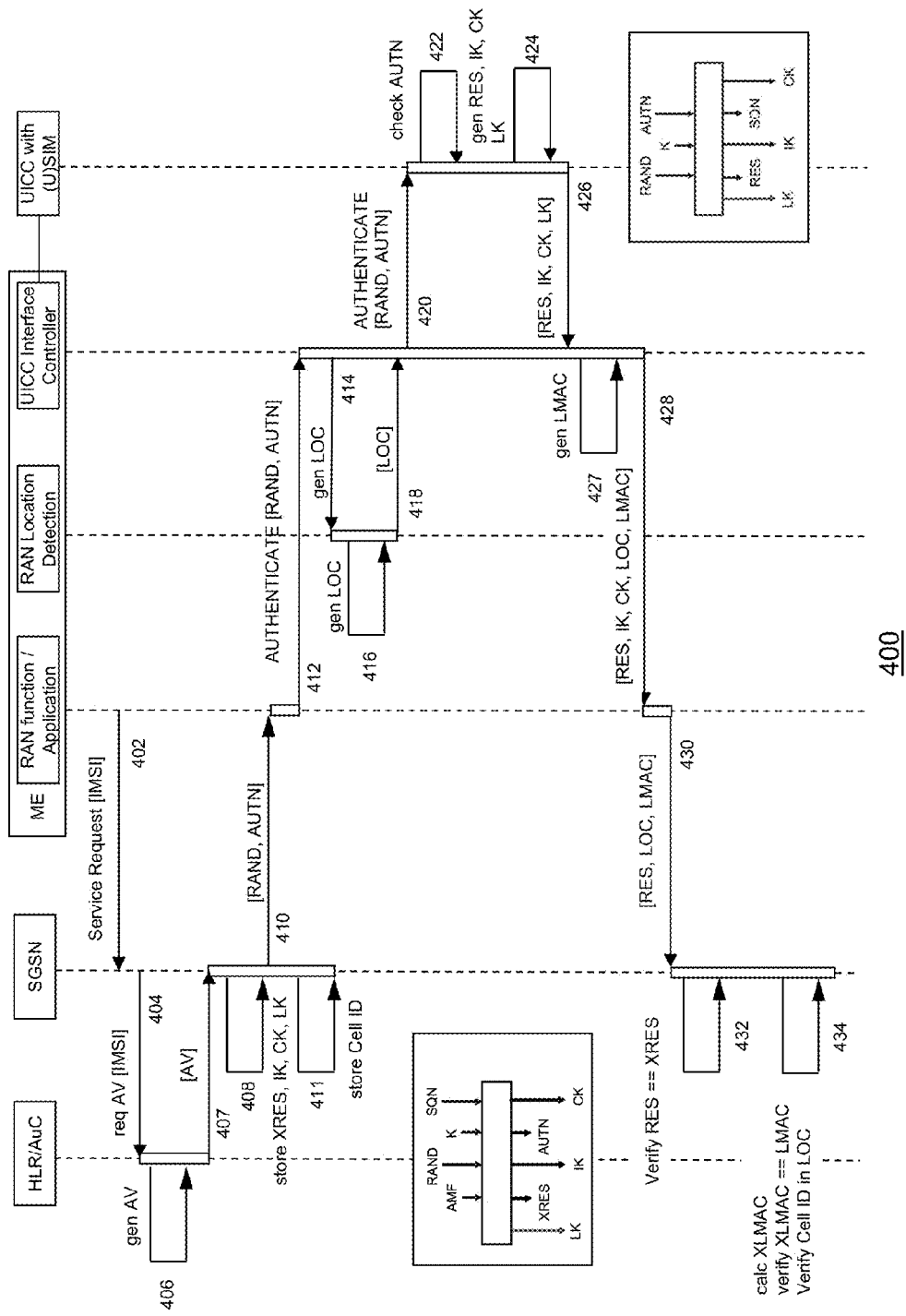
FIG. 4 depicts a message flow according to a second embodiment of the invention.

FIG. 4 depicts a message flow 400 according to second embodiment of the invention. In this embodiment, step 402-418 of the AKA procedure are similar to the one as described with reference to FIG. 3. In this case however, the (U)SIM only calculates LK 424, which is forwarded by the (U)SIM to the UICC-IC (step 426). The UICC-IC subsequently calculates the LMAC in step 427. In this way, the LOC parameter, which may be a relatively large parameters, does not need to be sent to and processed by the (U)SIM, thereby reducing the signaling between the UICC-IC and the (U)SIM and the processing load of the (U)SIM.

In a third embodiment, the location check may be performed as a separate (optional) step. This variant is depicted in the message flow 500 of FIG. 5, wherein in steps 502-527, the AKA parameters, including LK, are generated by the UICC-IC and (U)SIM in the same way as described with reference to FIG. 4. In this embodiment however, LOC and LMAC are not sent with the other AKA parameters RES, IK, CK to the radio card. Instead, in step 530, the UICC-IC stores the LOC and LMAC together with RAND (as received by the UICC-IC in step 512) and the LK (as received by the UICC-IC in step 526). Thereafter, RES, IK and CK are sent to the radio card (step 528), which forwards RES (step 532) to the SGSN for checking (step 534). The location check may be performed in a separate step, which is initiated by a request location message 536, 538 comprising the RAND sent to the UICC-IC, which in response returns the LOC and the LMAC (as stored in the UICC) to the SGSN (steps 540, 542). Using these location-based AKA parameters, the SGSN may verify the authenticity of authentication messages sent between the network and the ME by comparing the XLMAC with the LMAC and by subsequently verifying whether the Cell ID associated with the base station, which was used to send the authentication request comprising the AUTN and the RAND is present in the LOC (step 544). Further, the use of a separate location check provides the advantages that the AKA communication between the ME and the network is not modified.

Figure 6:
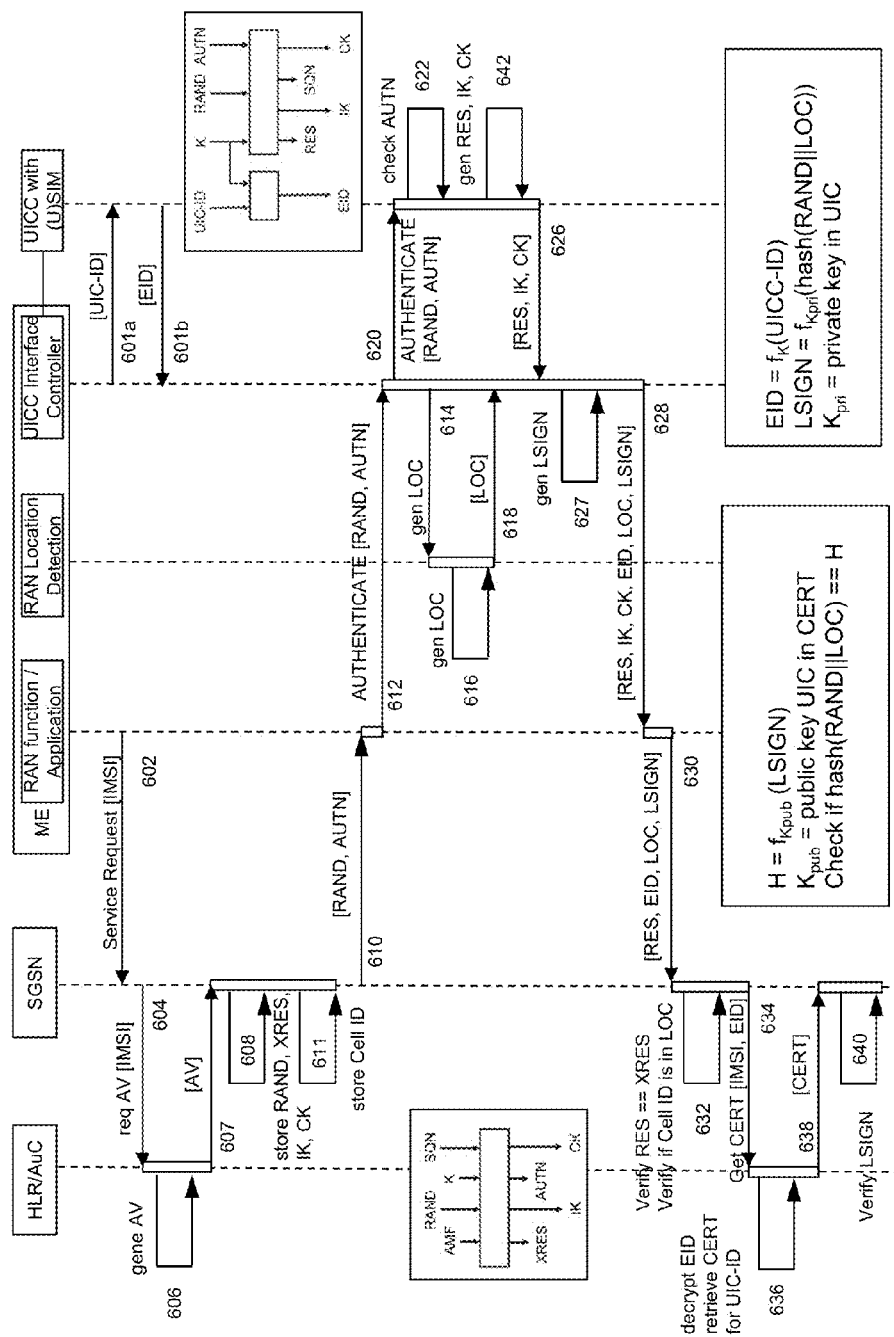
FIG. 6 depicts a message flow according to fourth embodiment of the invention.
Figure 7:
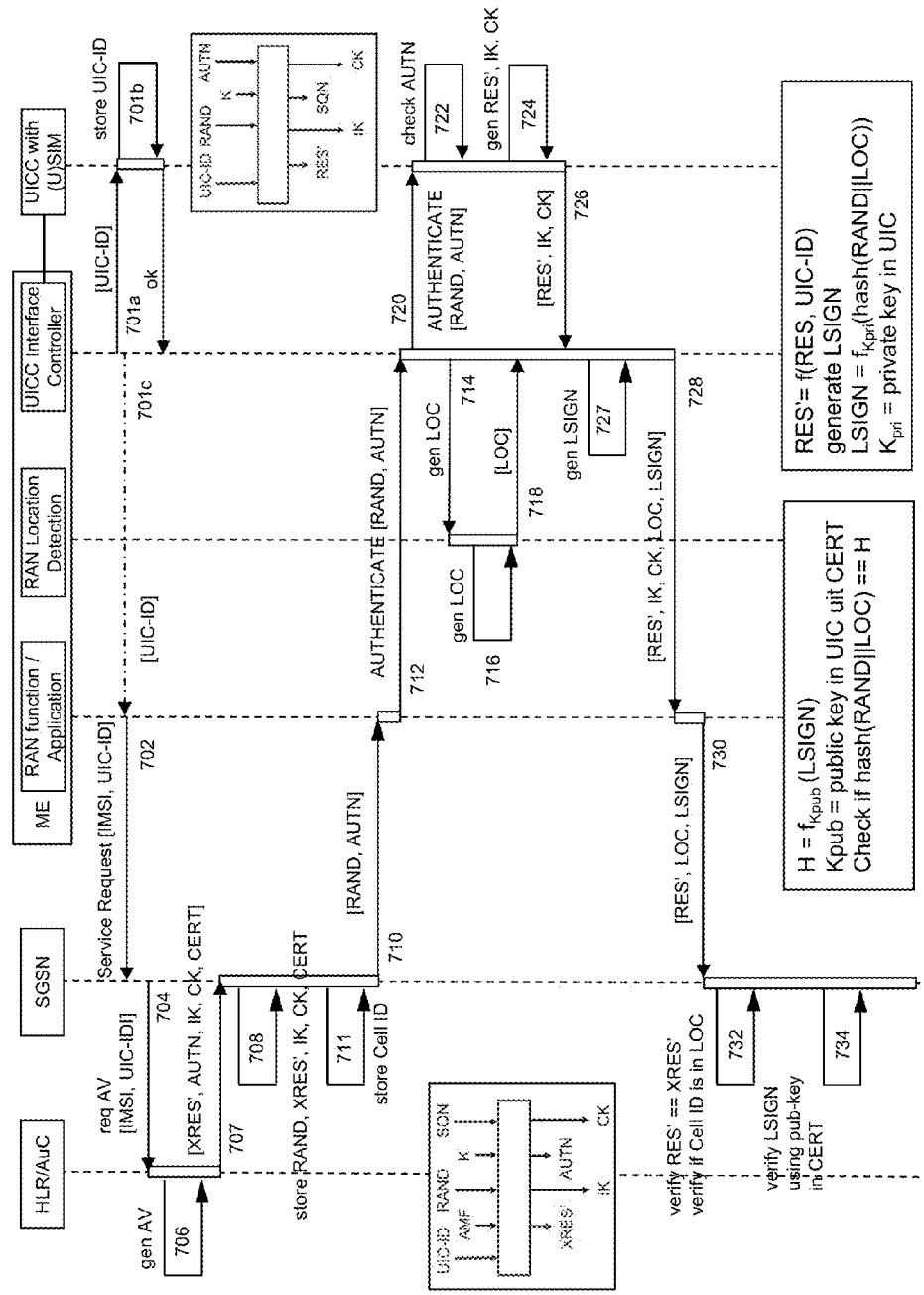
FIG. 7 depicts a message flow according to fifth embodiment of the invention.

FIG. 6 depicts a message flow 600 associated with a fourth embodiment. In particular, in this embodiment a public key based device authentication is combined with location-based AKA verification. To that end, the radio card, in particular the UICC-IC, may comprise a public key pair that may be used to create a secure digital signature over the LOC parameter (comprising e.g. the list of visible Cell IDs or the Cell ID the ME is connected to). In such case, the network is configured to identify the UICC-IC and to securely link the UICC-IC to the UICC. In one embodiment, such link may be established at start-up of the UICC using K in some operation.

In the example of FIG. 6, at start-up the UICC-IC may assign an identifier, UICC-ID, to the UICC and send this identifier to the (U)SIM (step 601a). In response, the (U)SIM returns the parameter EID, i.e. the UICC-ID in encrypted form: EID=$f_K$(UICC-ID) (step 601b). Thereafter, the AKA may start in a similar way to the ones described with reference to FIGS. 4 and 5. After sending a service request originating from a ME application to the SGSN (step 602), the SGSN may request an authentication vector from the HLR (step 604). In response, the HLR generates the AKA parameters, forwards these values to the SGSN, which stores these parameters in the network (steps 608, 611). Further, the SGSN may send an authentication request comprising RAND, AUTN via the UICC-IC to (U)SIM (steps 610, 612). The UICC-IC may then receive a LOC parameter from the RAN location detector (steps 614-618) and authentication response parameters RES, IK, CK from the (U)SIM (steps 620-626). Using the LOC, the UICC-IC may generate a location-based digital signature LSIGN using a cryptographic function. In one embodiment LSIGN may be generated using the private key $K_{pri}$ and the LOC concatenated with the RAND as an input variable. In order to improve security, in a further embodiment, the UICC-IC may use a Trusted Computing Module (TCM) or a Mobile Trusted Module for generating the LSIGN [http://www.trustedcomputinggroup.org/].

In a particular embodiment, LSIGN may be generated using the function $f_{K_{pri}}$(hash(RAND∥LOC)) or a suitable variant thereof (step 627). After generation of LSIGN, the UICC-IC may send an AKA response by sending RES, IK, CK, EID, LOC and LSIGN to the radio card (step 628), which subsequently forwards RES, EID, LOC and LSIGN to the network (step 630). The SGSN may then check whether RES matches XRES and verify the Cell ID over which the RAND was sent is contained in the LOC (step 632).

In order to verify the LSIGN, the SGSN requires a public key from the digital certificate associated with the UICC-IC. The public key may be retrieved by sending the EID and the IMSI to the HLR, which is capable of decrypting EID and retrieve the UICC-ID (steps 636). Using the UICC-ID, the correct digital certificate may be retrieved from the HLR and send to the SGSN (step 638). Thereafter, the LSIGN may be verified using the public key. In one embodiment, $f_{K_{pub}}$(LSIGN) may be calculated and matched with hash(RAND∥LOC)) (step 640). If a match is obtained, the network may determine that the authentication procedure is correctly executed.

In fifth variant, a secure link between the UICC-IC to the UICC may be obtained by making the AKA response dependent on the UICC-ID. This variant is depicted in more detail in the message flow 700 of FIG. 7. Upon start-up, the UICC-IC may provide the (U)SIM with an UICC-ID, which may store the identifier in a memory (steps 701a and 701b). Further, the UICC-IC may forward the UICC-ID to the radio card. The radio card may insert both the IMSI and the UICC-ID into a service request originating from a ME application, which is subsequently sent to the network (step 702). In response to the service request, the network, in particular the AuC, may generate the AKA parameters AUTN, IK, CK.

The AuC may further generate an expected authentication response XRES', which may be a function of the known XRES and UICC-ID. Using the UICC-ID the associated digital certificate CERT may be retrieved from the HLR (step 706). The thus generated parameters XRES', AUTN, IK, CK and the digital certificate CERT may be sent from the AuC to the SGSN (step 707), which stores these values in a database (step 708). Further, the SGSN may store the Cell-ID (step 711) associated with base station used for sending the authentication request comprising RAND and AUTN (via the UICC-IC) to the (U)SIM (steps 710, 712, 720). In response, the (U)SIM may check AUTN and calculate an UICC-ID depended response RES'=f(RES, UICC-ID) (steps 722, 724), which is returned together with IK and CK to the UICC-IC (step 726). Further, based on the LOC received from the RAN location detector (steps 714-718), the UICC-IC may generate a location-based digital signature LSIGN (step 727). In one embodiment the signature may be realized using similar cryptographic function as described above with reference to FIG. 6, i.e. $f_{Kpri}$(hash(RAND||LOC)) or a suitable variant thereof.

Figure 5:
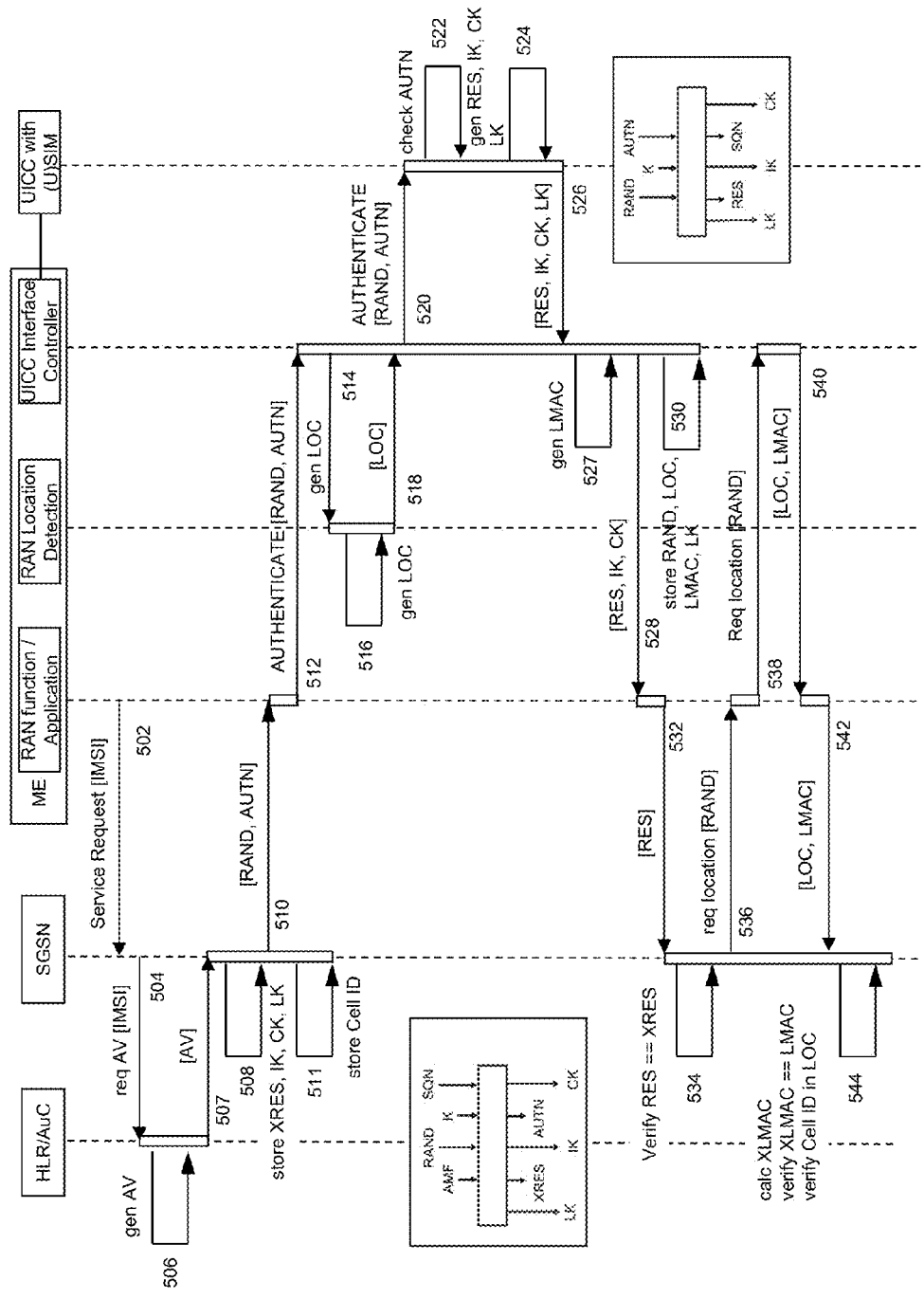
FIG. 5 depicts a message flow according to a third embodiment of the invention.

The thus generated parameters RES', LOC and LSIGN may be subsequently sent to the SGSN (steps 728, 730), which may check whether RES' matches XRES', check whether the Cell ID is contained in the LOC and verify LSIGN using the public key in the digital certificate CERT in a similar fashion as described with reference to FIG. 5. This embodiment provides the advantage that no encrypted UICC-ID has to be sent to the network.

It is noted that the invention is not limited to the embodiments described in FIG. 3-7 and that various embodiments may be combined without departing from the invention. For example, in a further embodiment, the processes described in FIG. 6 or 7 may be implemented using a separate location request as described with reference to FIG. 5.

Figure 8:
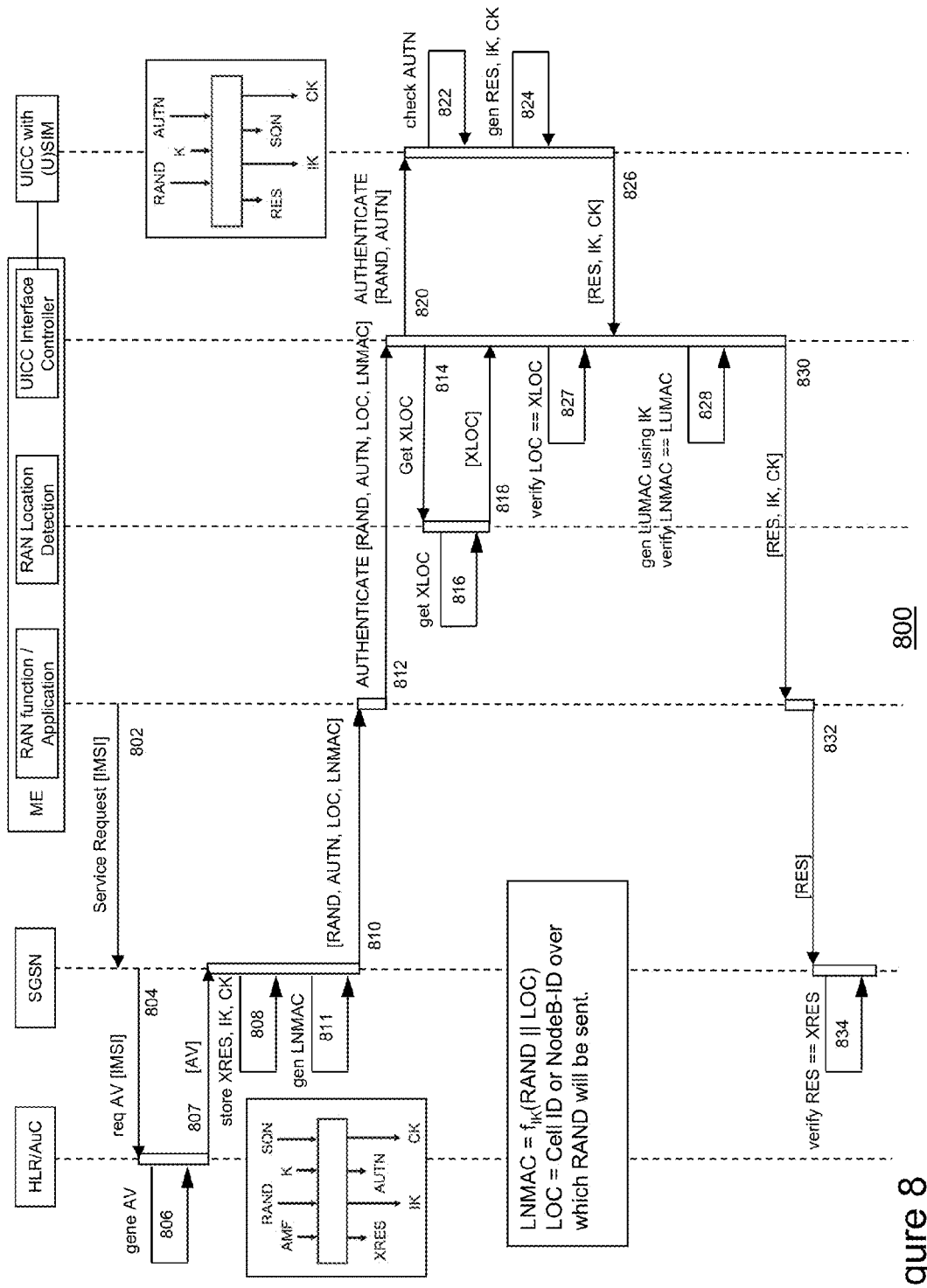
FIG. 8 depicts a message flow according to sixth embodiment of the invention.

FIG. 8 depicts a flow diagram 800 relating to a sixth embodiment of the invention. This embodiment relates to a location-based authentication method wherein the ME is configured to check the location information contained in the authentication messages. Similar to the flows as described with reference to FIG. 3-7, the AKA procedure may be started with a service request originating from a ME application, which is sent to the network (step 802). In response, a serving node, e.g. an SGSN, may forward a request for an authentication vector (AV) to the AuC (step 804). The AuC may subsequently generate the AKA parameters XRES, AUTN, IK and CK and forward these parameters to the SGSN (steps 806, 807). Further, in order to allow the ME to check whether it receives the RAND over the same Cell-ID as the network sent the RAND, the network will send location information LOC associated with the radio access node through which the authentication request was sent to ME in a secure way from the network to the ME together with the RAND and the AUTN. In order to protect the integrity of the LOC parameter, a specific MAC value, hereafter referred to as LNMAC, is generated over LOC and RAND using the Integrity Key (IK). In one embodiment, the LNMAC may be calculated using a cryptographic function LNMAC=$f_{IK}$(RAND||LOC)).

The SGSN may generate the LNMAC and stores this value along with the other AKA parameters received from the AuC in a secure database (step 808, 811). The SGNS thereafter sends an authentication request comprising RAND, AUTN, LOC and LNMAC to via the radio card to the UICC-IC (steps 810, 812). Here, in one embodiment, the location information LOC may represent the Cell ID or Node-B ID associated with the base stations over which the authentication request is sent. In response to the authentication request, the UICC-IC requests expected location information parameter XLOC from the RAN location detector, wherein XLOC may comprise a list of identifiers associated with base stations which are visible to the ME and/or at least one identifier associated with the base station to which the ME is currently connected to (steps 814-818).

Further, the UICC-IC may forward the authentication request comprising RAND and AUTN to the (U)SIM (step 820), which in response generates and returns the known AKA parameters RES, IK and CK to the UICC-IC (steps 222-826). If the location information LOC matches the expected location information XLOC, the ME may determine that the RAND was sent over the same base station as used by the network to send the RAND (step 827). The UICC-IC may then verify the integrity of the location information LOC using the digital signature LNMAC. To that end, the UICC-IC may calculate on the basis of IK, RAND and XLOC. In one embodiment, LUMAC may be calculated using a cryptographic function: LUMAC=$f_{IK}$(RAND||XLOC)).

If LNMAC matches LUMAC, the ME may determine that the authenticity of the messages between the ME and the network is correct (step 828). In that, case the UICC-IC may send the parameters RES, IK, CK to the radio card which forwards the RES to the SGNS (steps 830, 832) in order to finish the authentication procedure by verifying RES with XRES 834.

If the expected location information XLOC returned by the RAN location detector only comprises the Cell ID to which the ME is currently connected and if the UICC-IC determines no match between NLMAC and LUMAC, the UICC-IC may request a list of Cell IDs associated with base stations, which are visible to the ME. If the LOC is in the list of Cell IDs then the LOC may still be correct if the AKA came from a legitimate radio card connection connecting the ME via a BLUETOOTH® SIM profile to the network.

Further, if for some reason no LOC is available in the network, the network may leave the LOC parameter blank (e.g. "0 . . . 0"). The network however still should produce an LMAC in order for the UICC-IC to verify that the message originated from the home (or visited) network.

If no match is found, the UICC-IC will not forward the AKA parameters to the radio card so that the authentication procedure is stopped and no access to the network is obtained. The advantage of the embodiment depicted in FIG. 8 is that it does the HLR/AuC and the (U)SIM (or UICC) do not require any modifications.

It is submitted that the location based authentication procedures as described with reference to FIG. 3-8 are not only applicable to network access procedures, but may also be applied in other situations such accessing services based on a BLUETOOTH® SIM profile.

If a ME comprising an UICC is connected via a BLUETOOTH® interface, e.g. a BLUETOOTH® interface based on a BLUETOOTH® SIM profile, to a further mobile device comprising a radio card, it may be possible that the ME is not connected to a base station. In order to allow location-based authentication, wherein for example the location check is performed in the network, the UICC-IC in the ME may be configured to identify that an authentication request was sent via a trusted BLUETOOTH® SIM profile connection.

After receiving an authentication request originating from a BLUETOOTH® interface, the RAN location detector in the ME may be requested to generate a LOC parameter comprising a list of base stations which are visible to the ME. This parameter is subsequently sent in the authentication response back to the network. This way, the invention may also apply to authentication request which are sent via a BLUE-TOOTH® connection to an ME.

The location based authentication may also be used in Generic Bootstrapping Architectures (GBAs). The bootstrap function (BSF) may be configured to collect location information or the ME requesting a GBA AKA from some element in the home network, so that execution of a location-based authentication AKA may be possible. Similar considerations apply to location-based authentication in an IMS architecture.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Further, the invention is not limited to the use of location information in the form of cell IDs associated with radio access nodes within a predetermined area, typically the reception area, associated with the location of the mobile device but may also be implemented on the basis of for example location information on the basis of the absolute coordinates of the radio access nodes and the mobile device. An authentication request originating from the network may comprise first location information in the form of the absolute coordinates associated with the access network node through which the request was sent to the mobile phone. Similarly, the mobile device may generate second location information on the basis of a GPS receiver in the mobile device. For example, the GPS receiver may retrieve the absolute coordinates of the mobile and determine the second location information to be a predetermined area around these coordinates. Verification of the authentication request may then be executed by checking whether the coordinates of the radio access node are within the thus determined area. The invention is not limited to the embodiments described above, which may be varied within the scope of the accompanying claims.

The invention claimed is:

1. A hardware module for a mobile device, said hardware module comprising:
   a radio interface;
   a location detector; and
   an interface controller;
   wherein said hardware module is configured to communicate with a network for verifying an authenticity of one or more authentication messages in an authentication procedure between said network and said mobile device, wherein verifying said authenticity comprises checking whether second location information comprises first location information;
   wherein said radio interface is configured to provide a radio connection between said mobile device and a radio access node associated with said network;
   wherein said radio interface is further configured to receive an authentication request through said radio access node, said radio access node being associated with said first location information;
   wherein said location detector is configured to generate said second location information, wherein said second location information is associated with one or more radio access nodes which are within the radio reception range of said mobile device;
   wherein said radio interface is further configured to receive said first location information from said radio access network or to transmit said second location information to said radio access node; and
   wherein said interface controller is configured to connect a smart card to said hardware module, said smart card configured for generating authentication information in response to said authentication request.

2. The hardware module of claim 1, wherein the hardware module further comprises a microprocessor configured to check whether said second location information comprises said first location information.

3. A smart card for connecting to a hardware module according to claim 1, said smart card configured to generate an authentication response on the basis of said second location information and authentication information in said authentication request received by said radio interface of said hardware module.

4. The hardware module of claim 1, wherein the hardware module further comprises a microprocessor configured to generate a digital signature associated with said second location information.

5. A smart card, wherein the smart card is configured to connect to a hardware module for a mobile device, wherein said hardware module comprises:
   a radio interface;
   a location detector; and
   an interface controller;
   wherein said hardware module is configured to communicate with a network for verifying an authenticity of one or more authentication messages in an authentication procedure between said network and said mobile device, wherein verifying said authenticity comprises checking whether second location information comprises first location information;
   wherein said radio interface is configured to provide a radio connection between said mobile device and a radio access node associated with said network;
   wherein said radio interface is further configured to receive an authentication request through said radio access node, said radio access node being associated with said first location information;
   wherein said location detector is configured to generate said second location information, wherein said second location information is associated with one or more radio access nodes which are within the radio reception range of said mobile device;
   wherein said radio interface is further configured to receive said first location information from said radio access network or to transmit said second location information to said radio access node;

wherein said smart card is further configured to generate an authentication response on the basis of said second location information and authentication information in said authentication request received by said radio interface of said hardware module.

6. A hardware module for a mobile device, said hardware module comprising:

a radio interface;

a location detector; and an interface controller;

wherein said hardware module is configured to verify an authenticity of one or more authentication messages in an authentication procedure between a network and said mobile device;

wherein said radio interface is configured to provide a radio connection between said mobile device and a radio access node associated with said network;

wherein said radio interface is further configured to receive an authentication request through said radio access node, said radio access node being associated with first location information;

wherein said location detector is configured to generate second location information associated with one or more radio access nodes which are within the radio reception range of said mobile device;

wherein said hardware module is configured to verify an authenticity of said authentication request by checking whether said second location information comprises said first location information; and wherein said interface controller is configured to connect a smart card to said hardware module, said smart card configured to generate authentication information in response to said authentication request.

7. The hardware module of claim 6, wherein said radio interface is further configured to receive said first location information from said radio access node.

* * * * *